May 7, 1940.  J. L. McCOWEN  2,199,526
ELECTROMAGNETIC MATERIAL
Filed March 4, 1938
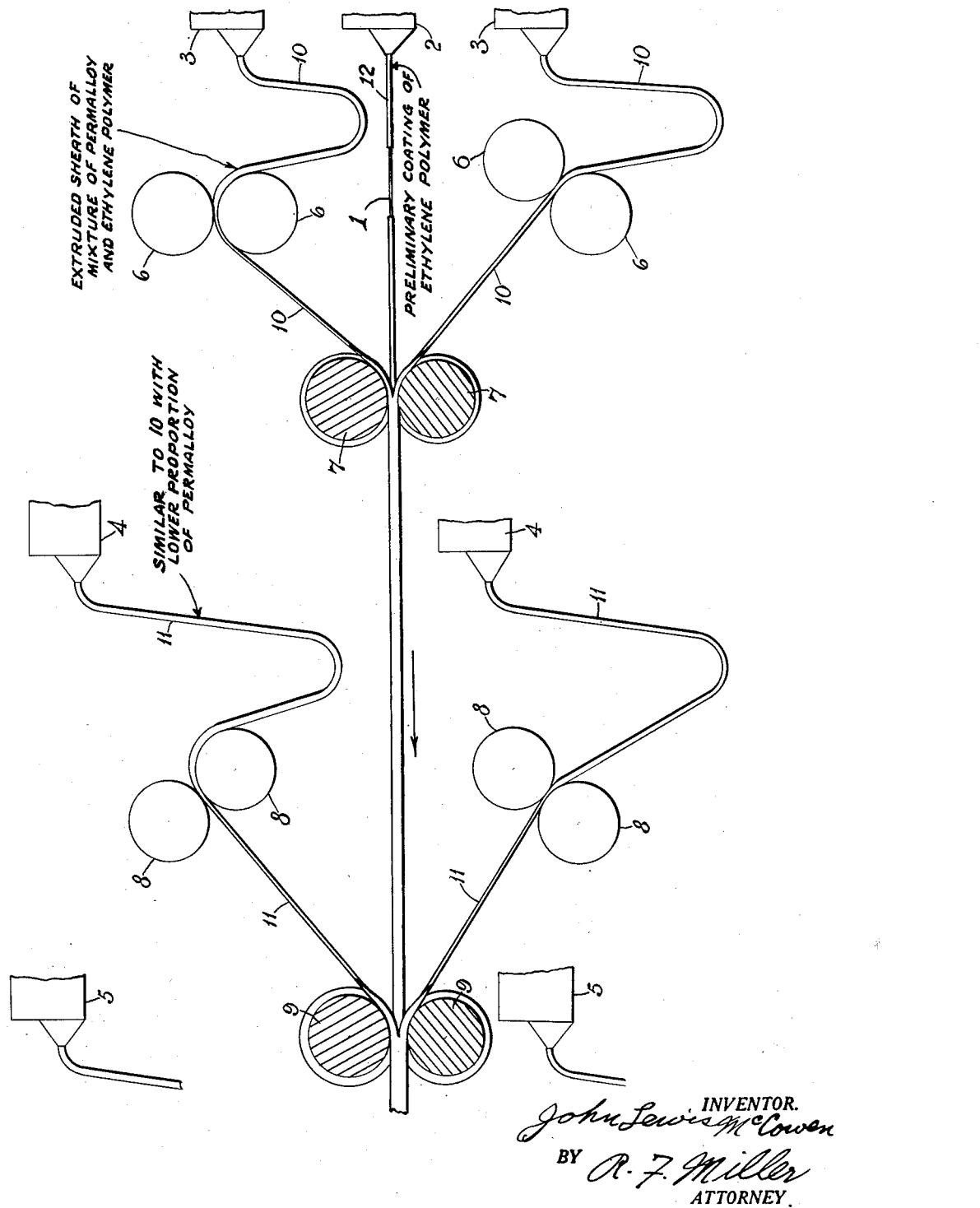

Patented May 7, 1940

2,199,526

UNITED STATES PATENT OFFICE 2,199,526

ELECTROMAGNETIC MATERIAL

John Lewis McCowen, Baline, Ballybrack County, Dublin, Ireland, assignor to Imperial Chemical Industries Limited, a corporation of Great Britain Application March 4, 1938, Serial No. 193,994
In Great Britain March 5, 1937

7 Claims. (Cl. 175—21)

This invention relates to electromagnetic material, particularly to material suitable for use when high frequency magnetic changes are desired. It has been proposed in the past to use an alloy of nickel and iron known as permalloy for material of this nature. It has also been proposed to use finely divided permalloy particles, each with a coating of an insulating material and compressed together, as the core of a coil when high frequency impulses are to be passed through the coil.

This invention has as an object to provide a new electromagnetic material of the above type. A further object is to provide a new electromagnetic material of the above type having an exceptional combination of properties, namely, a high tensile strength, a high degree of insulation between the particles of electromagnetic material, ductility, a high resistance to corrosion, a lack of brittleness, and a low di-electric power loss. A further object is to provide electromagnetic sheaths for cables, cores for coils, and other like articles from the new material. A further object is to provide an electromagnetic material which can be easily shaped by moulding, pressing or cutting. A further object is to devise a method of manufacturing such material and such articles. Further objects will appear hereinafter.

These objects are accomplished by the following invention.

I have found that I can make electromagnetic material of the above type by making an intimate mixture of a finely divided electromagnetic material, e. g., permalloy, with a polymer of ethylene (which may contain a small amount of oxygen) obtainable by subjecting ethylene with or without a small content of oxygen to very high pressure and moderately elevated temperature as described in United States Patent 2,153,553. The pressures are above 500 atmospheres, and preferably at least 1000 atmospheres. The temperatures are above 100° C. and usually not more than 400° C. Typical conditions are in the neighborhood of 2000 atmospheres at a temperature of about 170° C. for about 4 hours. The polymer, depending upon its molecular weight, melts from 100° C. to 120° C., corresponds in composition substantially to $(CH_2)_x$, is waxy in feel like paraffin wax, shows a crystalline structure upon X-ray examination, and is negligibly soluble in xylene at normal point but soluble at its boiling point.

The following examples illustrate some methods of manufacturing the new material and some of its uses:

Example 1

Finely divided particles of permalloy annealed in such a manner that they have the desired electromagnetic properties are mixed in any suitable manner with approximately equal bulk of polymerized ethylene at a temperature above the softening temperature of the polymer, that is, above about 110° C. The polymer is preferably one with a molecular weight of over 10,000. The mixture is thoroughly kneaded or stirred until the permalloy particles are completely and intimately mixed with the polymer and subsequently allowed to cool.

Example 2

A quantity of solid material made as in Example 1 is placed in a mould and pressed into the shape of a ring. The ring so formed is suitable for use as the core of a coil.

Example 3

The material made as in Example 1 before being allowed to cool is extruded through a nozzle to form a rod. This rod is then subjected to a tensioning process by passing between rollers or cold drawing by other means until its diameter has been reduced to about one-fifth. The effect of this cold working is to produce an orientation of the molecules of the polymer with the result of increasing the strength of the material.

Example 4

A rod as formed in Example 3, either before or after the cold drawing process, is passed between two rollers which form it into a ribbon. A ribbon of this nature can be used as a sheath for a telegraph or telephone cable, or as a recorder of high-frequency information, viz. transients on power and communication circuits, sound records, and the like.

Example 5

The figure illustrates diagrammatically a method of making a sheath for a telegraph cable of the new material. Referring to the figure, 1 represents the copper core of the cable. 2, 3, 4, and 5 represents the nozzles of extruders extruding the polymer permalloy mixture. 6, 7, 8 and 9 represent pairs of rollers, the rollers 7 and 9 being shaped so as to give an even pressure right round the core. 10 represents ribbons of polymer having a very high percentage of permalloy. 11 represents ribbons of polymer having a lower percentage of permalloy.

The core 1 passes through the nozzle 2 of an extruder which gives it a thin preliminary coating 12 of the polymer. From the nozzles 3 of a second extruder, two thick ribbons 10 of the polymer, having a large percentage of permalloy, are extruded. The ribbons are passed between the rollers 6, the rate of passage being such that the polymer has time to cool between the nozzle 3 and the roller 6. From the rollers 6, the ribbons are carried to the rollers 7, one ribbon being fed to each side of the wire 1. The rollers 7 press the polymer round the wire 1 and thereby give it a second coating of polymer containing this time a large percentage of permalloy. The operation of extruders 4 and rollers 6 and 9 is exactly the same, but this time a polymer is used with a lower percentage of permalloy, thereby giving the wire yet another coating less rich in permalloy. If required, a further coating can be put on in a similar way containing even less permalloy, and if necessary a final coating of polymer alone can be placed over all.

Although in Example 1 I used equal bulk of permalloy granules and the polymer, I am by no means limited to those quantities. The amount of permalloy to be used in the mixture will vary with the use to which the material is to be put.

In providing filaments or strips suitable for sound recording, the general operating methods described in applications S. N. 130,416 and S. N. 138,266 may be followed; inter alia, the former describes the manufacture of threads and the latter the manufacture of tape or ribbon of solid ethylene polymer. In the present invention, the initial material will be an intimate mixture of the polymer and finely divided ferromagnetic material.

This invention is a valuable advance in the art, providing an electromagnetic material that will soften at a very low temperature and so can be moulded by pressing or forming at a temperature so low that the electromagnetic properties of the permalloy are not upset and also the final articles made of this material have a high tensile strength and ductility so that they are not liable to be easily broken. At the same time, this preserves the permalloy from attack by the atmosphere or seawater and so renders the articles highly resistant to corrosion.

As many apparently widely different embodiments of this invention may be made without departing from the spirit and scope thereof it is to be understood that I do not limit myself to the specific embodiments thereof except as defined in the appended claims.

I claim:

1. An electromagnetic material comprising permalloy particles embedded in a polymer of ethylene which is solid at ordinary temperatures, said polymer of ethylene corresponding in composition substantially to $(CH_2)_x$ and showing a crystalline structure upon X-ray examination.

2. An electromagnetic material comprising permalloy particles embedded in a polymer of ethylene which is solid at ordinary temperatures and has a molecular weight of over 10,000, said polymer of ethylene corresponding in composition substantially to $(CH_2)_x$ and showing a crystalline structure upon X-ray examination.

3. A method of manufacturing electromagnetic material which comprises incorporating particles of permalloy with a liquified polymer of ethylene having a molecular weight of over 10,000 and causing the polymer to solidify, said polymer of ethylene corresponding in composition substantially to $(CH_2)_x$ and showing a crystalline structure upon X-ray examination.

4. A method of manufacturing electromagnetic material which comprises incorporating particles of permalloy with a liquified polymer of ethylene having a molecular weight of over 10,000 and causing the polymer to solidify and then subjecting the polymer to a tensioning process, said polymer of ethylene corresponding in composition substantially to $(CH_2)_x$ and showing a crystalline structure upon X-ray examination.

5. An electromagnetic core for an induction coil comprising permalloy particles embedded in a polymer of ethylene which is solid at ordinary temperatures, said polymer of ethylene corresponding in composition substantially to $(CH_2)_x$ and showing a crystalline structure upon X-ray examination.

6. An electrical cable comprising a core surrounded by a sheath of electromagnetic material comprising permalloy particles embedded in a polymer of ethylene, said polymer of ethylene corresponding in composition substantially to $(CH_2)_x$ and showing a crystalline structure upon X-ray examination.

7. An electrical cable comprising a core surrounded by a plurality of sheaths of permalloy particles embedded in a polymer of ethylene which is solid at ordinary temperatures, the percentage of permalloy particles in each sheath being smaller the further they are situated from the core, said polymer of ethylene corresponding in composition substantially to $(CH_2)_x$ and showing a crystalline structure upon X-ray examination.

JOHN L. McCOWEN.